(12) United States Patent
Lee et al.

(10) Patent No.: US 12,012,046 B2
(45) Date of Patent: Jun. 18, 2024

(54) REAR VIEW CAMERA FOR VEHICLE AND CONTROL METHOD THEREFOR

(71) Applicant: HYUNDAI MOBIS CO., LTD., Seoul (KR)

(72) Inventors: Won Moo Lee, Yongin-si (KR); Jee Chul Kim, Seoul (KR); Min Woo Kim, Yongin-si (KR); Jun Sang Lee, Seongnam-si (KR); Jae Chan Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 73 days.

(21) Appl. No.: 17/464,646

(22) Filed: Sep. 1, 2021

(65) Prior Publication Data

US 2022/0063516 A1 Mar. 3, 2022

(30) Foreign Application Priority Data

Sep. 2, 2020 (KR) .................. 10-2020-0111690

(51) Int. Cl.
*B60S 1/52* (2006.01)
*B08B 3/04* (2006.01)
*B08B 5/02* (2006.01)
*B60R 11/04* (2006.01)
*B60S 1/56* (2006.01)

(52) U.S. Cl.
CPC ............... *B60R 11/04* (2013.01); *B08B 3/04* (2013.01); *B08B 5/02* (2013.01); *B60S 1/56* (2013.01); *B60R 2300/806* (2013.01)

(58) Field of Classification Search
CPC . B60R 2300/806; B60R 11/04; B60S 1/0848; B60S 1/52
See application file for complete search history.

(56) References Cited

U.S. PATENT DOCUMENTS

| 8,031,224 | B2 * | 10/2011 | Linsenmaier | ........ H04N 5/2171 348/118 |
| 9,278,670 | B2 * | 3/2016 | Hattori | .................. B60S 1/0848 |
| 10,059,280 | B2 | 8/2018 | Cooper | |
| 2012/0293656 | A1 * | 11/2012 | Schutz | ................. H04N 5/2257 348/148 |

(Continued)

FOREIGN PATENT DOCUMENTS

JP 2017-013685 1/2017

*Primary Examiner* — Frank Johnson
(74) *Attorney, Agent, or Firm* — DLA Piper LLP (US)

(57) ABSTRACT

According to at least one aspect, the present disclosure provides a method comprising: determining whether a vehicle is traveling in reverse or is in a rear photographing mode; in response to determining that the vehicle is traveling in reverse or is in the rear photographing mode, opening an opening and closing unit included in an inner housing; as the opening and closing unit opens, drawing a camera and a fluid injection unit out of the vehicle; photographing, by the camera, a peripheral region of the vehicle; spraying, by the fluid injection unit, each of a washer fluid and air toward a lens surface of the camera; when the vehicle has ended traveling in reverse or the rear photographing mode, closing the opening and closing unit; and as the opening and closing unit closes, drawing the camera and the fluid injection unit into the vehicle.

19 Claims, 8 Drawing Sheets

(a)

(b)

(56) References Cited

U.S. PATENT DOCUMENTS

| | | | | |
|---|---|---|---|---|
| 2013/0048036 A1* | 2/2013 | Jonas | .......................... | B60S 1/56 |
| | | | | 134/167 R |
| 2013/0092758 A1* | 4/2013 | Tanaka | ...................... | B60S 1/52 |
| | | | | 239/284.1 |
| 2015/0183406 A1* | 7/2015 | Tanaka | ...................... | B08B 3/02 |
| | | | | 134/99.1 |
| 2015/0203077 A1* | 7/2015 | Gokan | ...................... | B05B 7/08 |
| | | | | 134/102.2 |
| 2015/0343999 A1* | 12/2015 | Lopez Galera | ....... | B60S 1/0848 |
| | | | | 134/30 |
| 2015/0353024 A1* | 12/2015 | Cooper | ................... | B60R 11/04 |
| | | | | 348/148 |
| 2016/0236558 A1* | 8/2016 | Koseki | ................. | H04N 5/2252 |
| 2016/0318456 A1* | 11/2016 | Moenig | ................... | B60R 11/04 |
| 2016/0339875 A1* | 11/2016 | Ina | ......................... | B60S 1/522 |
| 2017/0182980 A1* | 6/2017 | Davies | ...................... | B05B 9/04 |
| 2017/0210304 A1* | 7/2017 | Davies | ................... | B60R 11/04 |
| 2017/0313286 A1* | 11/2017 | Galera | ...................... | B08B 3/02 |
| 2018/0222450 A1* | 8/2018 | Kunze | ....................... | B60S 1/56 |
| 2018/0361998 A1* | 12/2018 | Renaud | ................... | B60R 11/04 |
| 2019/0016306 A1* | 1/2019 | Krishnan | ............... | G05D 1/024 |
| 2019/0039531 A1* | 2/2019 | Wilson | ................... | B60S 1/528 |
| 2019/0061698 A1* | 2/2019 | Mizuno | ................. | B60S 1/0848 |
| 2021/0253068 A1* | 8/2021 | Baudouin | ............... | B60S 1/528 |
| 2021/0284101 A1* | 9/2021 | Grasso | ................... | B60S 1/528 |
| 2022/0212634 A1* | 7/2022 | Ito | .......................... | B60R 11/04 |
| 2023/0031726 A1* | 2/2023 | Kubota | ................. | G03B 30/00 |

\* cited by examiner (a)

(b)

(a)

(b)

(a)

(b)

(a)

(b)

REAR VIEW CAMERA FOR VEHICLE AND CONTROL METHOD THEREFOR

CROSS-REFERENCE TO RELATED APPLICATION

This application claims priority to and the benefit of Korean Patent Application No. 10-2020-0111690, filed on Sep. 2, 2020, the disclosure of which is incorporated herein by reference in its entirety.

BACKGROUND

Field of the Invention

The present disclosure relates to a rear view camera for a vehicle and a method of controlling the same. More specifically, the present disclosure relates to a rear view camera for a vehicle, which is capable of removing foreign matter, and a method of controlling the same.

Discussion of Related Art

The content described in this section merely provides background information about the present disclosure and does not constitute the related art.

As a part of reversing assistance and parking assistance systems for a vehicle, a rear view camera is installed at the rear of the vehicle. The rear view camera photographs a view behind the vehicle, and a captured image is provided to a driver using a display device inside the vehicle. Since the driver can obtain the view behind the vehicle by viewing a display screen, the driver can safely reverse-park the vehicle.

Meanwhile, rear view cameras are mainly mounted on a garnish at the rear of a vehicle, and when the rear view cameras are installed to protrude to the outside, since the rear view cameras are exposed to water or pollutants, most of the rear view cameras are provided with parts for cleaning pollutants attached on the rear view cameras. Therefore, in order to avoid a problem in that pollutants are continuously attached on a camera, there is a rear view camera which is provided in a form that can be drawn into and out of a garnish and is designed to be drawn into the garnish when not being used.

However, even when a rear view camera is drawn into a garnish in order to avoid pollutants, after the rear view camera is drawn out of the garnish for photographing, pollutants may be attached during photographing. Therefore, even in this case, there is a need for a part for removing pollutants.

SUMMARY OF THE INVENTION

The present disclosure is directed to providing a rear view camera for a vehicle which is capable of avoiding continuous exposure to pollutants and also removing pollutants that are attachable to a lens surface of a camera, and a method of controlling the same.

According to at least one aspect, the present disclosure provides a method of controlling a rear view camera for a vehicle, the method comprising: determining whether a vehicle is traveling in reverse or is in a rear photographing mode; in response to determining that the vehicle is traveling in reverse or is in the rear photographing mode, opening an opening and closing unit included in an inner housing disposed inside the vehicle; as the opening and closing unit opens, drawing a camera and a fluid injection unit out of the vehicle, wherein the camera and the fluid injection unit are accommodated in the inner housing; photographing, by the camera, a peripheral region of the vehicle; spraying, by the fluid injection unit, each of a washer fluid and air toward a lens surface of the camera; when the vehicle has ended traveling in reverse or the rear photographing mode, closing the opening and closing unit; and as the opening and closing unit closes, drawing the camera and the fluid injection unit into the vehicle.

According to another aspect, the present disclosure provides a rear view camera system for a vehicle, comprising: a camera configured to photograph a peripheral region of a vehicle; a fluid injection unit positioned in a region adjacent to the camera and configured to spray each of a washer fluid and air toward a lens surface of the camera; an inner housing configured to accommodate the camera and the fluid injection unit, the inner housing being disposed inside the vehicle and including an opening and closing unit configured to allow the camera and the fluid injection unit to be drawn into or out of the vehicle; and an opening and closing driving unit which opens or closes the opening and closing unit and moves the camera and the fluid injection unit so as to be drawn into and out of the vehicle.

Figure 1:
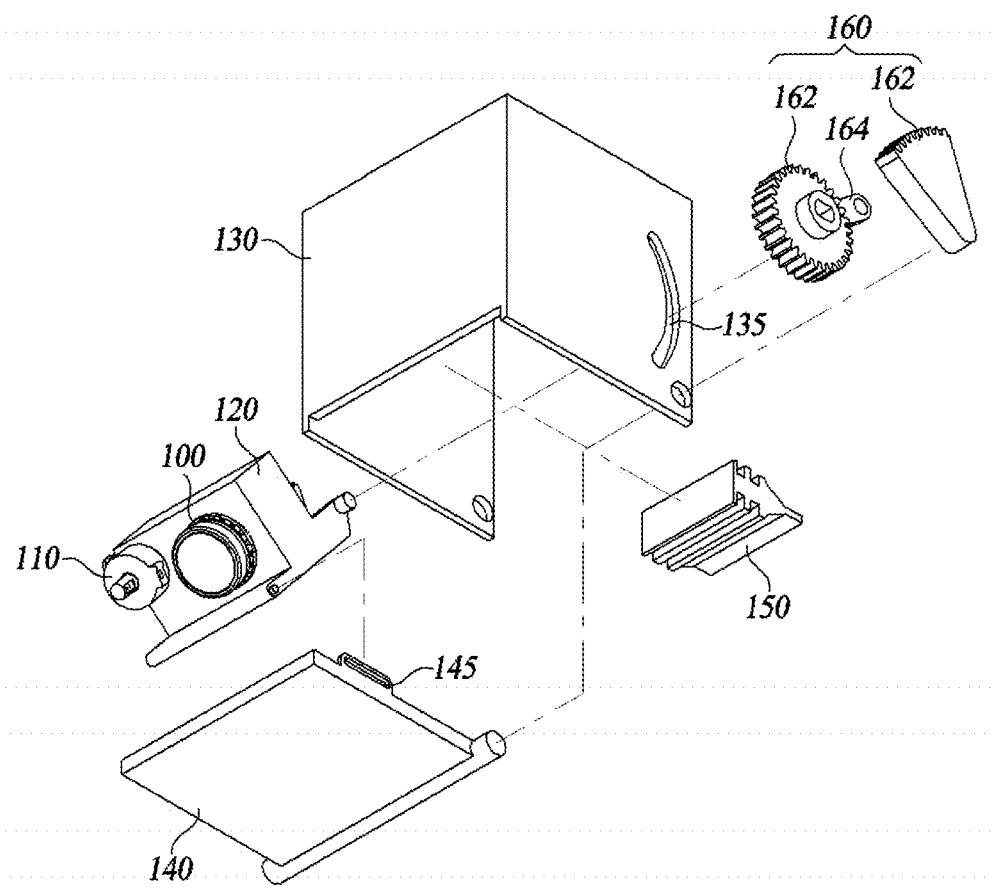
FIG. 1 is an exploded perspective view of a rear view camera for a vehicle according to one embodiment of the present disclosure.

| REFERNCE NUMERICALS | |
|---|---|
| 100: camera | 110: fluid injection unit |
| 120: fixing housing | 130: inner housing |
| 135: first guide hole | 140: opening and closing |
| 145: second guide hole | 150: wiper |
| 160: opening and closing driving unit | 162: gear unit |
| 164: rotating arm | 400: air nozzle unit |
| 420: washer fluid nozzle unit | 440: air inlet |
| 460: washer fluid inlet | |

DETAILED DESCRIPTION OF EMBODIMENTS

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is an exploded perspective view of a rear view camera for a vehicle according to one embodiment of the present disclosure.

Figure 2:
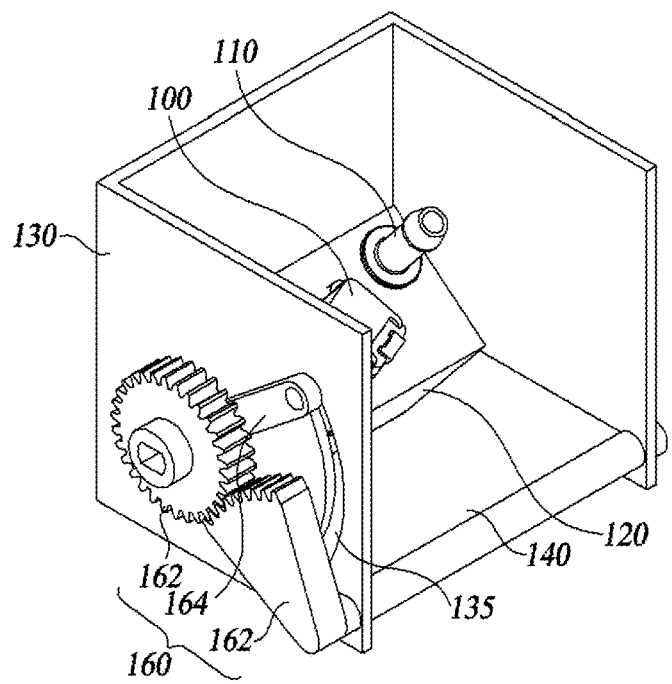
FIG. 2 is a perspective view of the rear view camera for a vehicle according to one embodiment of the present disclosure.

FIG. 2 is a perspective view of the rear view camera for a vehicle according to one embodiment of the present disclosure.

Referring to FIGS. 1 and 2, the rear view camera for a vehicle according to one embodiment of the present disclosure includes all or some of a camera 100, a fluid injection unit 110, an inner housing 130, an opening and closing driving unit 160, a wiper 150, a fixing housing 120, and a foreign matter detection unit (not shown).

The camera 100 is configured to photograph a peripheral region of a vehicle. For example, the camera 100 may be positioned on a garnish positioned at the rear of the vehicle, that is, at a position at which a decorative part is provided. However, the camera 100 is not necessarily limited to the position, and as long as the camera 100 can serve to assist in parking the vehicle and serve to photograph a rear region behind the vehicle, the camera 100 may be positioned elsewhere in the vehicle.

The fluid injection unit 110 is disposed in a region adjacent to the camera 100 and is configured to spray a fluid. For example, the fluid injection unit 110 may be configured to spray air and a washer fluid toward a lens surface of the camera 100. That is, the fluid injection unit 110 may spray a washer fluid and air toward the lens surface of the camera 100 at the same time or at different times according to situations and purposes, thereby removing pollutants attached to the camera 100. However, fluids sprayed by the fluid injection unit 110 are not necessarily limited to the washer fluid and air.

The inner housing 130 is disposed inside the vehicle and configured to accommodate the camera 100 and the fluid injection unit 110. In addition, the inner housing 130 includes an opening and closing unit 140 which allows the camera 100 and the fluid injection unit 110 to be drawn into or out of the vehicle. Therefore, when the opening and closing unit 140 is closed, the camera 100 and the fluid injection unit 110 are accommodated in the inner housing 130, and when the opening and closing unit 140 is opened, the camera 100 and the fluid injection unit 110 protrude to the outside of the vehicle. Since the camera 100 and the fluid injection unit 110 may be drawn into or out of the vehicle according to the situation by the opening and closing unit 140, exposure to external pollutants can be reduced as compared with a case in which the camera 100 always protrudes to the outside of the vehicle.

Meanwhile, the camera 100 may be configured to start photographing a peripheral region of the vehicle when being drawn out of the vehicle. That is, in order to increase a lifetime of the camera 100, when the vehicle is traveling forward, the camera 100 may be drawn into the vehicle without being operated, and when the vehicle is traveling in reverse, the camera 100 may be provided to be operated by being drawn out of the vehicle.

The opening and closing driving unit 160 opens or closes the opening and closing unit 140 and moves the camera 100 and the fluid injection unit 110 so as to be drawn into or out of the vehicle. The opening and closing driving unit 160 is driven by a driving motor (not shown), and the driving motor is controlled by a control unit (not shown). For example, when the vehicle is traveling in reverse, the control unit may control the driving motor to open the opening and closing unit 140, and when the vehicle is traveling forward, the control unit may control the driving motor to close the opening and closing unit 140. Accordingly, the driving of the opening and closing driving unit 160 may be controlled by the control unit, and thus, the opening/closing of the opening and closing unit 140 and the movement of the camera 100 and the fluid injection unit 110 may be controlled by the control unit.

The opening and closing driving unit 160 may include a gear unit 162 which moves by being connected to the driving motor. In this case, the camera 100 and the fluid injection unit 110 may be provided to be moved according to the movement of the gear unit 162. That is, the gear unit 162 may be rotated by the driving motor, and the opening and closing unit 140 may be opened or closed according to the rotational movement of the gear unit 162 so that the camera 100 and the fluid injection unit 110 may be drawn into or out of the vehicle.

The wiper 150 is fixedly coupled to the inner housing 130 and is configured to remove foreign matter on the lens surface of the camera 100 in a process in which the camera 100 is drawn into and out of the vehicle. Accordingly, in the rear view camera for a vehicle according to one embodiment of the present disclosure, foreign matter can be removed not only by the fluid injection unit 110 but also by the wiper 150.

The fixing housing 120 allows the camera 100 and the fluid injection unit 110 to move in conjunction with each other according to the movement of the gear unit 162. That is, the fixing housing 120 may surround at least portions of the camera 100 and the fluid injection unit 110 such that the camera 100 and the fluid injection unit 110 do not deviate from a preset position. Here, the preset position refers to, for example, a position where a point at which a fluid is sprayed from the fluid injection unit 110 is positioned at a higher level than a center of a lens of the camera 100. This is to ensure that a point at which a fluid is sprayed from the fluid injection unit 110 is positioned at a higher level than the center of the lens of the camera 100 allows a fluid cleaning the lens surface of the camera 100 to naturally fall toward the ground due to gravity.

Meanwhile, the rear view camera for a vehicle according to one embodiment of the present disclosure may include a first guide hole 135 and a second guide hole 145 which are configured to guide the movement of the camera 100 and the fluid injection unit 110.

The first guide hole 135 is formed in at least one side surface of the inner housing 130 and is configured to guide the movement of the camera 100 and the fluid injection unit 110. In addition, when the opening and closing driving unit 160 includes the gear unit 162, the opening and closing driving unit 160 may further include a rotating arm 164 connected to the gear unit 162 and provided to reciprocate along the first guide hole 135 according to the movement of the gear unit 162.

The second guide hole 145 is formed in at least one side surface of the opening and closing unit 140 and is configured to guide the movement of the camera 100 and the fluid injection unit 110. In addition, the fixing housing 120 may be connected to the rotating arm 164 and may be provided to reciprocate along the first guide hole 135 and the second guide hole 145 according to the movement of the rotating arm 164.

The rear view camera for a vehicle according to one embodiment of the present disclosure may include the first guide hole 135, the second guide hole 145, the rotating arm 164, and the fixing housing 120, and thus, the camera 100 and the fluid injection unit 110 may be firmly drawn into or out of the vehicle without shaking. However, the rear view camera for a vehicle according to one embodiment of the present disclosure does not necessarily include such a configuration and may also include other configurations as long as the camera 100 and the fluid injection unit 110 can be safely drawn into or out of the vehicle.

The foreign matter detection unit detects whether foreign matter is present on the lens surface of the camera 100. Foreign matter may be detected by analyzing information about an image captured by the camera 100. Accordingly, the foreign matter detection unit may be formed using, for example, an image signal processor (ISP) included in the camera 100. That is, the foreign matter detection unit may analyze a screen of an image captured by the camera 100 to determine whether foreign matter is present on the lens surface of the camera 100. However, whether foreign matter is present is not necessarily determined by analyzing an image captured by the camera 100, and whether foreign matter is present on the lens surface of the camera 100 may be determined using a separate sensor.

Figure 3:
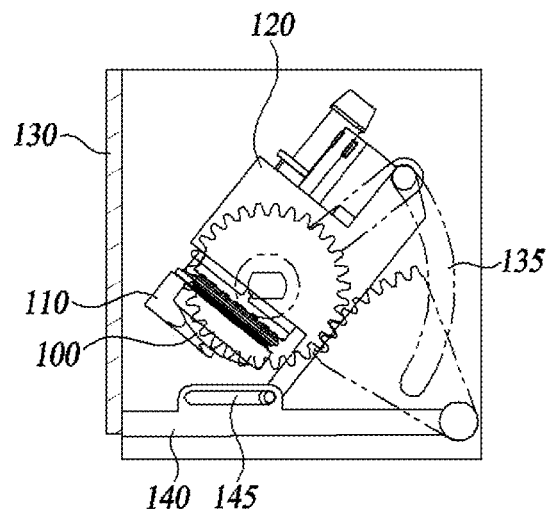
FIG. 3 shows side views illustrating a process in which the rear view camera for a vehicle according to one embodiment of the present disclosure is drawn in and out.
Figure 3:
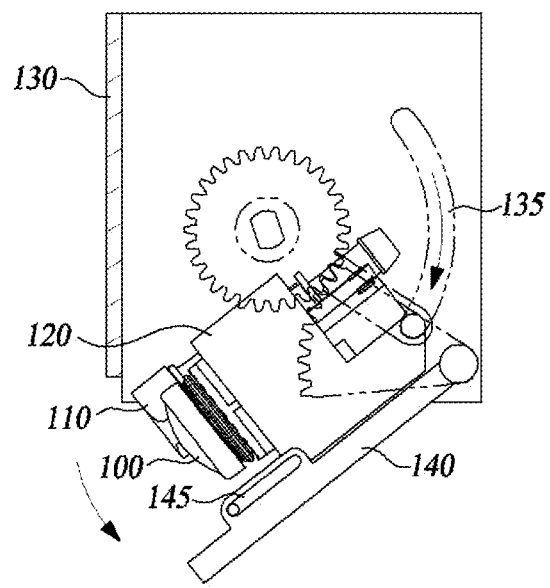

FIG. 3 shows side views illustrating a process in which the rear view camera for a vehicle according to one embodiment of the present disclosure is drawn in and out.

Referring to FIG. 3A, the rear view camera for a vehicle according to one embodiment of the present disclosure is in a state of being drawn into the vehicle. For example, when the vehicle is not in a rear photographing mode, the rear view camera for a vehicle according to one embodiment of the present disclosure is in a state of being drawn into the vehicle, that is, the opening and closing unit 140 is closed and the camera 100 is accommodated in the inner housing 130, thereby avoiding exposure to external pollutants. Here, the rear photographing mode refers to a situation in which, even when the vehicle is traveling forward or is stopped, the rear view camera photographs a view behind the vehicle in order to monitor the view behind the vehicle. In a state in which the camera 100 is drawn into the vehicle, the camera 100 is not operated.

Referring to FIG. 3B, the rear view camera for a vehicle according to one embodiment of the present disclosure is in a state of being drawn out of the vehicle. For example, when the vehicle is traveling in reverse or in the rear photographing mode, the rear view camera for a vehicle according to one embodiment of the present disclosure is drawn out of the vehicle to photograph a rear region behind the vehicle.

That is, the camera 100 may be operated in a state of being drawn out of the vehicle, and whether to operate the camera 100 may be controlled by the control unit. For example, when the vehicle is traveling in reverse or is in the rear photographing mode, the control unit may perform control such that the camera 100 is operated, and when the vehicle is not in the rear photographing mode, the control unit may perform control such that the camera 100 is not operated.

Meanwhile, the driving motor may rotate the gear unit 162 in order for the rear view camera for a vehicle according to one embodiment of the present disclosure to be drawn into or out of the vehicle. In this case, as the gear unit 162 is rotated, the rotating arm 164 moves along the first guide hole 135, and the opening and closing unit 140 is opened or closed. At the same time, one end part of the fixing housing 120 is connected to the rotating arm 164 to move along the first guide hole 135, and the other end part of the fixing housing 120 is coupled to the second guide hole 145 to move along the second guide hole 145.

Figure 4:
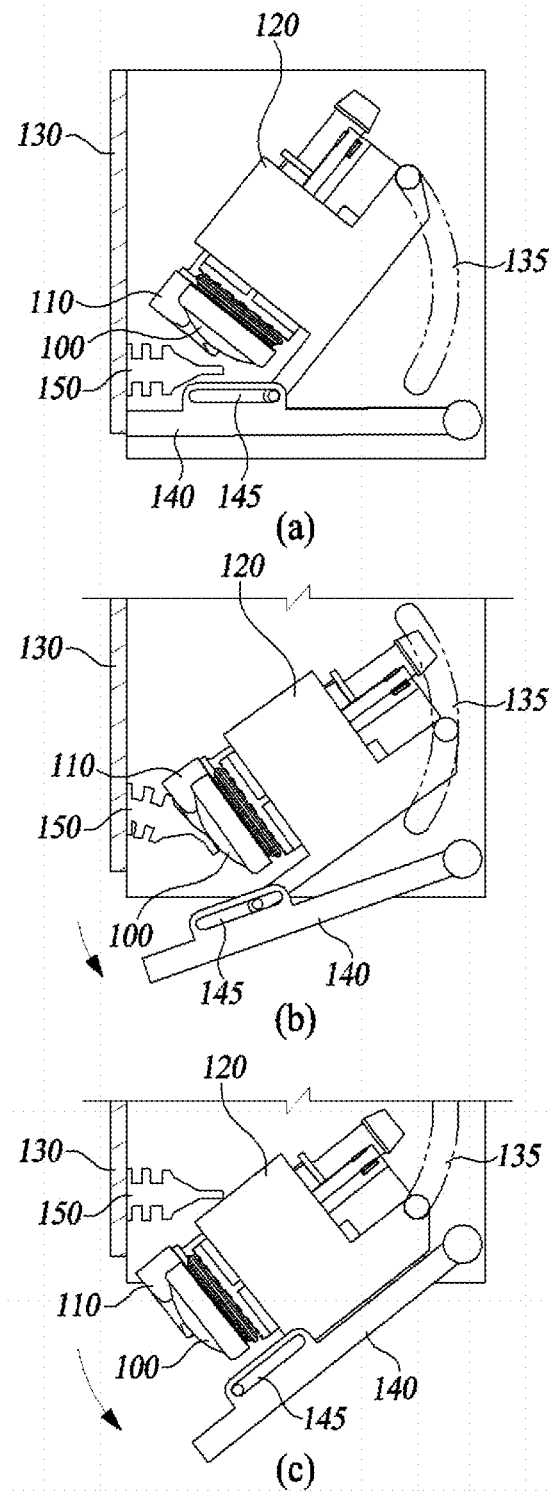
FIG. 4 shows views for describing a process in which a camera of the rear view camera for a vehicle according to one embodiment of the present disclosure is cleaned by a wiper.

FIG. 4 shows views for describing a process in which the camera 100 of the rear view camera for a vehicle according to one embodiment of the present disclosure is cleaned by the wiper 150.

The wiper 150 is fixedly coupled to the inner housing 130 and is configured to remove foreign matter on the lens surface of the camera 100 in a process in which the camera 100 is drawn into and out of the vehicle. That is, one end part of the wiper 150 is fixedly coupled to the inner housing 130, and the other end part of the wiper 150 is provided to come into contact with the camera 100 in a process in which the camera 100 is drawn into and out of the vehicle. While the other end part of the wiper 150 comes into contact with the lens surface of the camera 100, the camera 100 may move, and in such a process, the wiper 150 may remove foreign matter on the lens surface of the camera 100.

Meanwhile, in a process in which the wiper 150 comes into contact with the lens surface of the camera 100, the end part thereof may be formed to be bent. Therefore, the wiper 150 may be made of a material having elasticity, for example, rubber.

Figure 5:
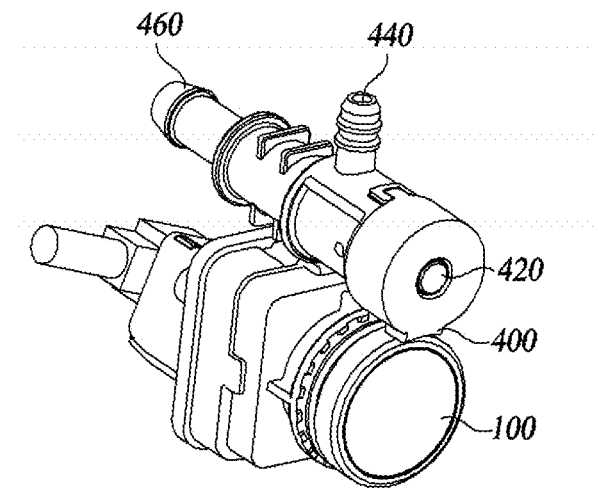
FIG. 5 shows exploded perspective views illustrating shapes of a fluid injection unit and a camera according to one embodiment of the present disclosure.
Figure 5:
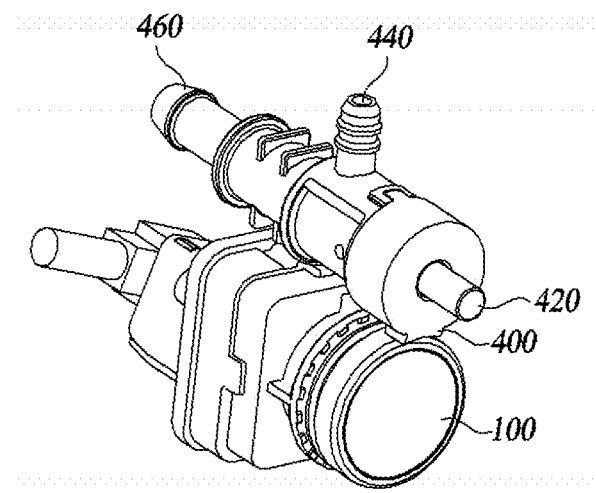

FIG. 5 shows exploded perspective views illustrating shapes of the fluid injection unit 110 and the camera 100 according to one embodiment of the present disclosure.

Figure 6:
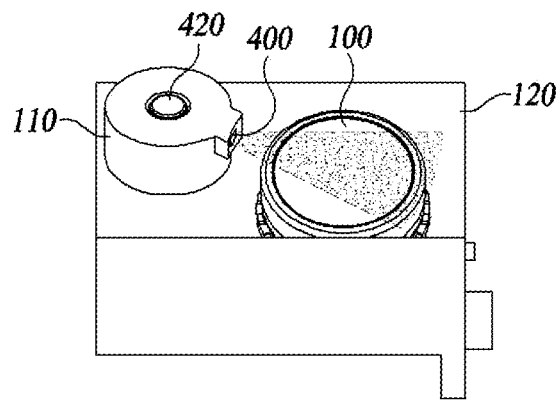
FIG. 6 shows views for describing a process in which a fluid injection unit sprays each of a washer fluid and air according to one embodiment of the present disclosure.
Figure 6:
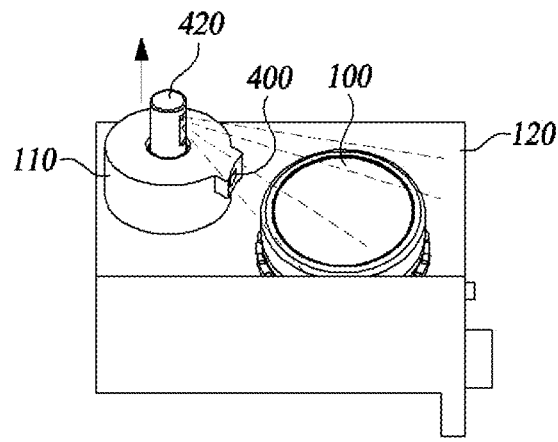

FIG. 6 shows views for describing a process in which the fluid injection unit 110 sprays each of a washer fluid and air according to one embodiment of the present disclosure.

Referring to FIGS. 5 and 6, the fluid injection unit 110 of the rear view camera for a vehicle according to one embodiment of the present disclosure includes all or some of an air nozzle unit 400, a washer fluid nozzle unit 420, a nozzle driving unit (not shown), an air inlet 440, and a washer fluid inlet 460.

The air nozzle unit 400 is configured to spray air toward the lens surface of the camera 100. The air nozzle unit 400 may be disposed adjacent to, for example, an end part of the fluid injection unit 110.

The washer fluid nozzle unit 420 is configured to spray a washer fluid toward the lens surface of the camera 100. In addition, when foreign matter is not detected on the lens of the camera 10, the washer fluid nozzle unit 420 may be accommodated in the fluid injection unit 110, and when foreign matter is detected on the lens of the camera 100, the washer fluid nozzle unit 420 may be provided to protrude from the fluid injection unit to the outside. For example, the washer fluid nozzle unit 420 may move between the inside and outside of the fluid injection unit 110 based on a longitudinal cross section of the fluid injection unit 110.

The nozzle driving unit drives the air nozzle unit 400 and the washer fluid nozzle unit 420 under control of the control unit. That is, under control of the control unit, the nozzle driving unit may allow air to be sprayed from the air nozzle unit 400 and allow a washer fluid to be sprayed from the washer fluid nozzle unit 420. In addition, the nozzle driving unit may drive the washer fluid nozzle unit 420 such that the washer fluid nozzle unit 420 moves between the inside and the outside of the fluid injection unit 110.

For example, when the foreign matter detection unit detects foreign matter on the lens surface of the camera 100, the foreign matter detection unit transmits a foreign matter detection signal to the control unit, and the control unit receiving the signal controls the nozzle driving unit to allow the washer fluid nozzle unit 420 to protrude to the outside of the fluid injection unit 110 and to spray a washer fluid. When the washer fluid nozzle unit 420 protrudes to the outside of the fluid injection unit 110 and sprays a washer fluid to remove foreign matter, the foreign matter detection unit does not transmit a foreign matter detection signal to the control unit, and the control unit not receiving the signal controls the driving unit to allow the washer fluid nozzle unit 420 to be accommodated in the fluid injection unit 110.

When foreign matter is not removed by the fluid injection unit 110, the foreign matter detection unit may proceed to detect foreign matter on the lens surface of the camera 100, and thus, the fluid injection unit 110 may continuously spray a fluid. In this case, the wiper 150 may be used to attempt to remove foreign matter, or a driver may directly clean the lens surface of the camera 100. Accordingly, a user of the rear view camera for a vehicle according to one embodiment of the present disclosure can allow the foreign matter detection unit to not be operated. That is, when foreign matter on the lens surface of the camera 100 is not removed by the fluid injection unit 110, the user can stop the operation of the foreign matter detection unit.

However, the nozzle driving unit is not necessarily controlled only by the control unit, and the user of the rear view camera according to one embodiment of the present disclosure can drive the nozzle driving unit by operating a cleaning button (not shown) electrically connected to the nozzle driving unit and separately present inside the vehicle. That is, a cleaning mode may be operated by operating the cleaning button, and the cleaning mode may be divided into an air spraying mode, a washer fluid spraying mode, a washer fluid and air spraying mode, and the like. In the air spraying mode, air may be sprayed for, for example, about four seconds, in the washer fluid spraying mode, a washer fluid may be sprayed for, for example, about five seconds, and in the washer fluid and air spraying mode, a washer fluid may be sprayed for, for example, for five seconds, the spraying may be stopped for three seconds, and then, air may be sprayed for four seconds. Accordingly, even when the foreign matter detection unit is not operated, the user may operate the cleaning button to spray a fluid desired by the user toward the lens surface of the camera 100 as needed.

When the fluid injection unit 110 sprays each of a washer fluid and air, the washer fluid may be primarily sprayed, and then the air may be secondarily sprayed. This is to remove a portion of the washer fluid, which remains on the lens surface of the camera 100 after the washer fluid is sprayed, by using air. Accordingly, the fluid injection unit 110 of the rear view camera for a vehicle according to one embodiment of the present disclosure may be configured to spray a washer fluid and air according to a preset order and time. Here, the preset order and time may be set such that, for example, a washer fluid is primarily sprayed for five seconds, the spraying is stopped for three seconds, and then, air is secondarily sprayed for four seconds. The control unit may control the nozzle driving unit to allow the fluid injection unit 110 to spray a washer fluid and air according to the preset order and time.

However, a spraying order of a washer fluid and air is not necessarily preset, and the spraying order and time of the washer fluid and air may be arbitrarily determined by the user. The control unit may control the nozzle driving unit according to an order and time determined by the user to allow the fluid injection unit 110 to spray a fluid in an order and time desired by the user. In addition, the user may set such that only one of a washer fluid and air is sprayed according to the type of foreign matter, and the control unit may control the nozzle driving unit according to the setting of the user to allow only a fluid desired by the user to be sprayed from the fluid injection unit 110.

The air inlet 440 is configured to inject air to be sprayed by the air nozzle unit 400. Accordingly, a through-hole through which air may be introduced is formed in one end part of the air inlet 440, and the other end part of the air inlet 440 is connected to the air nozzle unit 400.

The washer fluid inlet 460 is configured to inject a washer fluid to be sprayed by the washer fluid nozzle unit 420. Accordingly, a through-hole through which a washer fluid may be introduced is formed in one end part of the washer fluid inlet 460, and the other end part of the washer fluid inlet 460 is connected to the washer fluid nozzle unit 420.

Meanwhile, in the fluid injection unit 110 according to one embodiment of the present disclosure, the washer fluid nozzle unit 420 is provided to protrude from the fluid injection unit 110 to the outside, and the air nozzle unit 400 is disposed adjacent to the end part of the fluid injection unit 110, but the present disclosure is not necessarily limited thereto. For example, the fluid injection unit 110 may be provided such that the air nozzle unit 400 protrudes from the fluid injection unit 110 to the outside, and the washer fluid nozzle unit 420 may be disposed adjacent to the end part of the fluid injection unit 110.

In this case, when foreign matter is not detected on the lens of the camera 100 or a washer fluid is being sprayed from the washer fluid nozzle unit 420, the air nozzle unit 400 may be accommodated in the fluid injection unit 110, and when foreign matter is detected on the lens of the camera 100 and a washer fluid is sprayed from the washer fluid nozzle unit 420, the air nozzle unit 400 may be provided to protrude from the fluid injection unit 110 toward the outside.

Since the fluid injection unit 110 of the rear view camera for a vehicle according to one embodiment of the present disclosure includes such a configuration, the fluid injection unit 110 can spray each of a washer fluid and air according to situations and purposes so that the camera 100 can effectively remove foreign matter attached on the lens.

Figure 7:
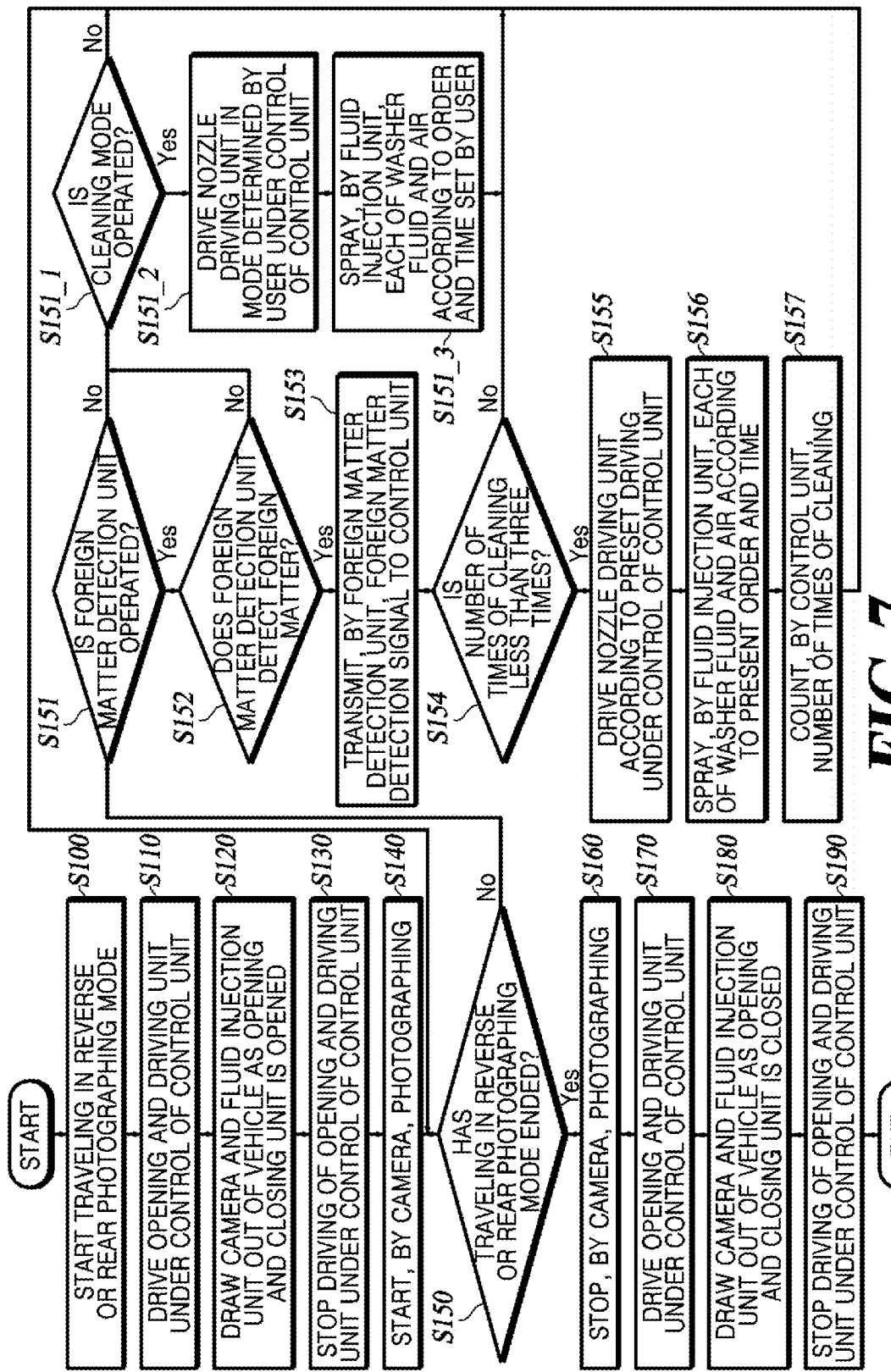
FIG. 7 is a flowchart illustrating a method of controlling a rear view camera for a vehicle according to one embodiment of the present disclosure.

FIG. 7 is a flowchart illustrating a method of controlling a rear view camera for a vehicle according to one embodiment of the present disclosure.

Figure 8:
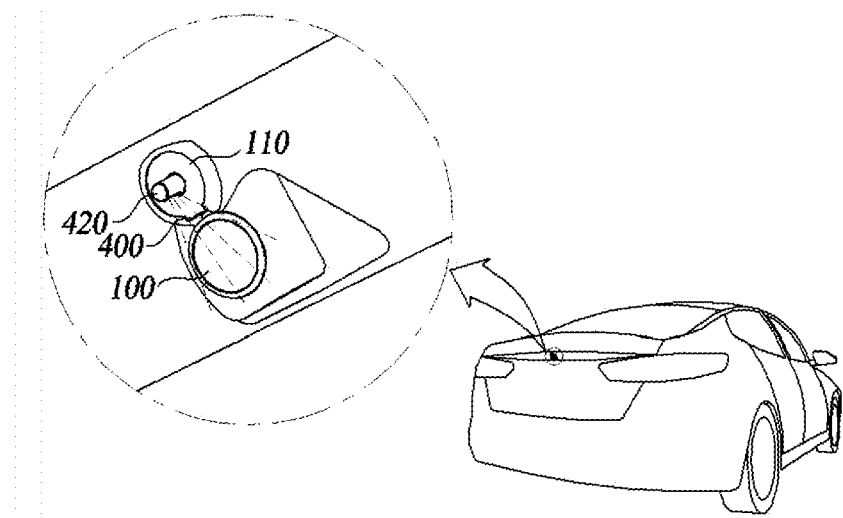
FIG. 8 shows views illustrating a case in which a rear view camera according to one embodiment of the present disclosure is mounted on a vehicle and operated.
Figure 8:
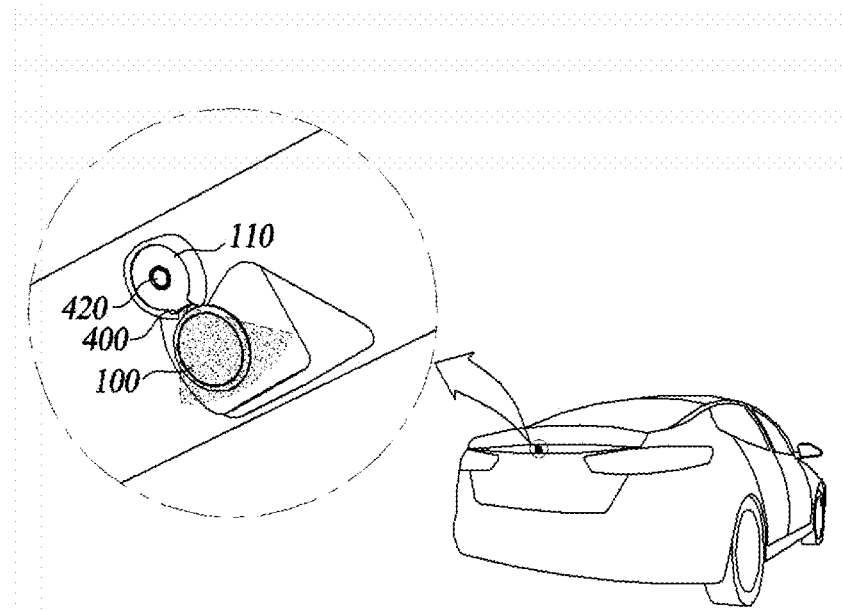

FIG. 8 shows views illustrating a case in which a rear view camera according to one embodiment of the present disclosure is mounted on a vehicle and operated.

Referring to FIG. 7, first, a vehicle starts traveling in reverse or a rear photographing mode (S100). Meanwhile, a control unit may determine whether the vehicle travels in reverse or is in the rear photographing mode. When it is determined that the vehicle travels in reverse or is in the rear photographing mode, the control unit controls an opening and closing driving unit 160. Accordingly, the opening and closing driving unit 160 is driven under control of the control unit (S110). As an opening and closing unit 140 is opened by the driving of the opening and closing driving unit 160, a camera 100 and a fluid injection unit 110 are drawn out of the vehicle (S120). When the camera 100 and the fluid injection unit 110 are drawn out of the vehicle, the driving of the opening and closing driving unit 160 is stopped under control of the control unit (S130). The camera 100 is turned on, and accordingly, the camera 100 starts photographing (S140). The control unit determines whether the vehicle has ended traveling in reverse or the rear photographing mode while the camera 100 continues photographing (S150).

When the vehicle does not end traveling in reverse or the rear photographing mode, it is determined whether a foreign matter detection unit is in an operating state or in a non-operating state (S151). A control method varies according to whether the foreign matter detection unit is in an operating state or in a non-operating state. That is, a user of a rear view camera for a vehicle according to one embodiment of the present disclosure may set such that the foreign matter detection unit is not operated, and when the foreign matter detection unit is in a non-operating state, it is determined again whether a cleaning mode is in an operating state or in a non-operating state (S151_1). A control method varies according to whether the cleaning mode is in an operating state or in a non-operating state. When the cleaning mode is also in a non-operating state, cleaning is not performed, and the control unit proceeds to determine whether the vehicle has ended traveling in reverse or the rear photographing mode (S150).

When the cleaning mode is in an operating state, the user selects, for example, any one of an air spraying mode, a washer fluid spraying mode, a washer fluid and air spraying mode by operating a cleaning button. In this case, a nozzle driving unit is driven in a mode determined by the user under control of the control unit (S151_2). When the nozzle driving unit is driven, a fluid injection unit 110 sprays each of a washer fluid and air according to an order and time determined by the user (S151_3). Accordingly, when the cleaning of a lens surface of the camera 100 is ended, the control unit proceeds to determine whether the vehicle has ended traveling in reverse or the rear photographing mode (S150).

On the other hand, when the foreign matter detection unit is in an operating state, the foreign matter detection unit detects foreign matter (S152). When the foreign matter detection unit does not detect foreign matter, the above-described control method is performed according to whether the cleaning mode is in an operating state or in a non-operating state. When the foreign matter detection unit detects foreign matter, the foreign matter detection unit transmits a foreign matter detection signal to the control unit (S153). The control unit receiving the foreign matter detection signal determines whether the number of times of cleaning is, for example, less than three times (S154). When the number of times of cleaning is greater than or equal to three times, the control unit does not perform cleaning on the camera 100 and proceeds to determine whether the vehicle has ended traveling in reverse or the rear photographing mode (S150). This is to prevent cleaning from being continuously performed when foreign matter is not removed even after the cleaning has already been performed twice by the foreign matter detection unit. That is, when foreign matter is not removed even after cleaning has been performed twice, it may be possible to attempt to remove foreign matter using a wiper 150, or a driver may directly clean the lens surface of the camera 100. Thus, the cleaning by the fluid injection unit 110 is stopped.

When the number of times of cleaning is less than three times, the nozzle driving unit is driven according to preset driving under control of the control unit (S155). Here, the preset driving may be, for example, driving in which the fluid injection unit 110 primarily sprays a washer fluid for five seconds, stops spraying for three seconds, and then secondarily sprays air for four seconds. As the nozzle driving unit is driven, the fluid injection unit 110 sprays each of a washer fluid and air according to a preset order and time (S156). Here, the preset order and time may be set such that, for example, a washer fluid is primarily sprayed for five seconds, the spraying is stopped for three seconds, and then, air is secondarily sprayed for four seconds. After the fluid injection unit 110 sprays each of the washer fluid and the air, the control unit counts the number of times of cleaning (S157). Even after counting the number of times of cleaning, the control unit proceeds to determine whether the vehicle has ended traveling in reverse or the rear photographing mode (S150).

When the vehicle has ended traveling in reverse or the rear photographing mode, the camera 100 is turned off, and accordingly, the camera 100 stops photographing (S160). The control unit controls the opening and closing driving unit 160, and accordingly, the opening and closing driving unit 160 is driven under control of the control unit (S170). Accordingly, the opening and closing unit 140 is closed by the driving of the opening and closing driving unit 160, and as the opening and closing unit 140 closes, the camera 100 and the fluid injection unit 110 are drawn into the vehicle (S180). When the camera 100 and the fluid injection unit 110 are drawn into the vehicle, the driving of the opening and closing driving unit 160 is stopped under control of the control unit (S190).

Referring to FIG. 8, the rear view camera for a vehicle according to one embodiment of the present disclosure is mounted on a rear garnish of a vehicle. In the rear view camera mounted on the rear garnish of the vehicle, a fluid injection unit 110 sprays each of a washer fluid and air according to the above-described control method to remove foreign matter attached to a lens surface of a camera 100.

As described above, in the rear view camera for a vehicle according to one embodiment of the present disclosure, since the camera 100 may be drawn in or out of the vehicle, continuous exposure to external contaminants can be avoided, and pollutants attached to the camera 100 can be removed by the fluid injection unit 110. In addition, foreign matter that is not primarily removed by the fluid injection unit 110 can be secondarily removed using the wiper 150, thereby more effectively removing foreign matter on the lens surface of the camera 100.

As described above, according to the present embodiment, it is possible to avoid continuous exposure to pollutants and to also remove pollutants that are attachable to a lens surface of a camera.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A method of controlling a rear view camera for a vehicle, the method comprising:
   determining whether a vehicle is traveling in reverse or is in a rear photographing mode;

in response to determining that the vehicle is traveling in reverse or is in the rear photographing mode, opening an opening and closing unit included in an inner housing disposed inside the vehicle;

as the opening and closing unit opens, drawing a camera and a fluid injection unit out of the vehicle, wherein the camera and the fluid injection unit are accommodated in the inner housing;

photographing, by the camera, a peripheral region of the vehicle;

spraying, by the fluid injection unit including a washer fluid nozzle unit and an air nozzle unit, each of a washer fluid and air toward a lens surface of the camera;

when the vehicle has ended traveling in reverse or the rear photographing mode, closing the opening and closing unit; and as the opening and closing unit closes, drawing the camera and the fluid injection unit into the vehicle, wherein the spraying of each of the washer fluid and the air toward the lens surface of the camera includes spraying the washer fluid from the washer fluid nozzle unit and spraying the air from the air nozzle unit which is spaced apart in a spraying direction from the washer fluid nozzle unit, a size of another inter-nozzle space between the air nozzle unit and the washer fluid nozzle unit and perpendicular to the spraying direction being changed based on whether the washer fluid nozzle unit is spraying the washer fluid or whether the air nozzle unit is spraying the air.

2. The method of claim 1 comprising, after the photographing of the peripheral region of the vehicle, detecting whether foreign matter is present on the lens surface of the camera, wherein the spraying of each of the washer fluid and the air toward the lens surface of the camera is performed when the foreign matter is detected on the lens surface of the camera.

3. The method of claim 2, wherein the detecting of whether the foreign matter is present on the lens surface of the camera is performed when a foreign matter detection unit included in the camera is in an operating state.

4. The method of claim 2 comprising, after the spraying of each of the washer fluid and the air toward the lens surface of the camera, counting a number of times of cleaning when a fluid is sprayed from the fluid injection unit to perform cleaning.

5. The method of claim 4, wherein the spraying of each of the washer fluid and the air toward the lens surface of the camera is performed when the number of times of cleaning when the fluid is sprayed from the fluid injection unit to perform cleaning is less than or equal to a preset number of times.

6. The method of claim 1, wherein the spraying of each of the washer fluid and the air toward the lens surface of the camera is performed according to an order and time determined by a user or a preset order and time.

7. The method of claim 1, wherein the drawing of the camera and the fluid injection unit out of the vehicle includes turning the camera on; and the drawing of the camera and the fluid injection unit into the vehicle includes turning the camera off.

8. The method of claim 1, wherein the opening of the opening and closing unit and the closing of the opening and closing unit are performed by an opening and closing driving unit configured to move the camera and the fluid injection unit so as to be drawn into and out of the vehicle.

9. The method of claim 1, wherein the drawing of the camera and the fluid injection unit into the vehicle and the drawing of the camera and the fluid injection unit out of the vehicle includes removing, by a wiper fixedly coupled to the inner housing, foreign matter on the lens surface of the camera.

10. The method of claim 1, wherein the spraying of the washer fluid toward the lens surface of the camera includes allowing the washer fluid nozzle unit to protrude from the fluid injection unit and change the space between the washer fluid nozzle unit and the air nozzle unit.

11. A rear view camera system for a vehicle, comprising:

a camera configured to photograph a peripheral region of a vehicle;

a fluid injection unit positioned in a region adjacent to the camera and configured to spray each of a washer fluid and air toward a lens surface of the camera;

an inner housing configured to accommodate the camera and the fluid injection unit, the inner housing being disposed inside the vehicle and including an opening and closing unit configured to allow the camera and the fluid injection unit to be drawn into or out of the vehicle; and an opening and closing driving unit which opens or closes the opening and closing unit and moves the camera and the fluid injection unit so as to be drawn into and out of the vehicle, wherein the fluid injection unit comprises:

an air nozzle unit configured to spray air toward the lens surface of the camera; and a washer fluid nozzle unit configured to spray a washer fluid toward the lens surface of the camera, wherein the air nozzle unit and the washer fluid nozzle unit are spaced apart from each other in a spraying direction of the washer fluid and the air, a size of another inter-nozzle space between the air nozzle unit and the washer fluid nozzle unit and perpendicular to the spraying direction being changed based on whether the washer fluid nozzle unit is spraying the washer fluid or whether the air nozzle unit is spraying the air.

12. The rear view camera system of claim 11 further comprising a foreign matter detection unit configured to detect whether foreign matter is present on the lens surface of the camera.

13. The rear view camera system of claim 11 further comprising a wiper fixedly coupled to the inner housing and configured to remove foreign matter on the lens surface of the camera during a process in which the camera is drawn into and out of the vehicle.

14. The rear view camera system of claim 11, wherein the fluid injection unit comprises:

an air inlet through which air to be sprayed by the air nozzle unit is introduced; and a washer fluid inlet through which the washer fluid to be sprayed by the washer fluid nozzle unit is introduced.

15. The rear view camera system of claim 14, wherein, when foreign matter is not detected on the lens of the camera, the washer fluid nozzle unit is accommodated in the fluid injection unit, and when the foreign matter is detected on the lens of the camera, the washer fluid nozzle unit protrudes from the fluid injection unit and changes the space between the washer fluid nozzle unit and the air nozzle unit.

16. The rear view camera system of claim 15, wherein the air nozzle unit is disposed adjacent to an end part of the fluid injection unit.

17. The rear view camera system of claim 11, wherein, when the camera is drawn out of the vehicle, the camera is configured to start photographing the peripheral region of the vehicle.

18. The rear view camera system of claim 11, wherein the opening and closing driving unit includes a gear unit which moves by being connected to a driving motor, and
   the rear view camera comprises a fixing housing configured to allow the camera and the fluid injection unit to move in conjunction with each other according to movement of the gear unit.

19. The rear view camera system of claim 18 comprising:
a first guide hole formed in at least one surface of the inner housing and configured to guide movement of the camera and the fluid injection unit;
a second guide hole formed in at least one surface of the opening and closing unit and configured to guide the movement of the camera and the fluid injection unit; and
a rotating arm connected to the gear unit and provided to reciprocate along the first guide hole according to movement of the gear unit,
wherein the fixing housing is connected to the rotating arm and is provided to reciprocate along the first guide hole and the second guide hole according to movement of the rotating arm.

* * * * *